US012727620B2

(12) United States Patent
Hijma

(10) Patent No.: US 12,727,620 B2
(45) Date of Patent: Sep. 8, 2026

(54) INDUCTION HEATING ASSEMBLY FOR AN AEROSOL GENERATING DEVICE

(71) Applicant: JT International SA, Geneva (CH)

(72) Inventor: Herman Hijma, Kampen (NL)

(73) Assignee: JT International SA, Geneva (CH)

( * ) Notice: Subject to any disclaimer, the term of this patent is extended or adjusted under 35 U.S.C. 154(b) by 421 days.

(21) Appl. No.: 18/273,875

(22) PCT Filed: Jan. 26, 2022

(86) PCT No.: PCT/EP2022/051777
§ 371 (c)(1),
(2) Date: Jul. 24, 2023

(87) PCT Pub. No.: WO2022/167291
PCT Pub. Date: Aug. 11, 2022

(65) Prior Publication Data
US 2024/0081411 A1 Mar. 14, 2024

(30) Foreign Application Priority Data
Feb. 2, 2021 (EP) .................................... 21154695

(51) Int. Cl.
*A24F 40/465* (2020.01)
*A24F 40/20* (2020.01)
*A24F 40/51* (2020.01)
*H05B 6/06* (2006.01)

(52) U.S. Cl.
CPC ............ *A24F 40/465* (2020.01); *A24F 40/20* (2020.01); *A24F 40/51* (2020.01); *H05B 6/06* (2013.01)

(58) Field of Classification Search
None
See application file for complete search history.

(56) References Cited

U.S. PATENT DOCUMENTS

2018/0192700 A1 7/2018 Fraser et al.
2019/0124979 A1 5/2019 Sebastian et al.
2019/0191767 A1 6/2019 Wu et al.
2019/0230987 A1 8/2019 Wu et al.
(Continued)

FOREIGN PATENT DOCUMENTS

CN 107708453 A 2/2018
CN 207766584 U 8/2018
(Continued)

OTHER PUBLICATIONS

International Search Report for PCT/EP2022/051777 mailed Apr. 19, 2022. 4 pgs.

*Primary Examiner* — Cynthia Szewczyk
(74) *Attorney, Agent, or Firm* — Lerner David LLP

(57) ABSTRACT

An induction heating assembly for an aerosol generating device comprises a heating chamber for receiving at least part of an aerosol generating substrate, an induction coil positioned externally of the heating chamber for generating an electromagnetic field, and a holder positioned inside the heating chamber. The induction heating assembly further comprises an inductively heatable susceptor mounted on the holder, the inductively heatable susceptor having an inner surface and an outer surface, and a temperature sensor mounted on the holder in contact with the outer surface of the inductively heatable susceptor.

18 Claims, 7 Drawing Sheets

(56) References Cited

U.S. PATENT DOCUMENTS

| | | | |
|---|---|---|---|
| 2021/0059309 | A1 | 3/2021 | Gill |
| 2021/0093009 | A1 | 4/2021 | Park et al. |

FOREIGN PATENT DOCUMENTS

| | | | | | |
|---|---|---|---|---|---|
| CN | 111542239 | A | | 8/2020 | |
| EP | 3357359 | A2 | | 8/2018 | |
| EP | 3469936 | A2 | | 4/2019 | |
| EP | 3900552 | A1 | * | 10/2021 | ............. A24F 40/51 |
| JP | 2019129820 | A | | 8/2019 | |
| JP | 2019134701 | A | | 8/2019 | |
| KR | 20200078410 | A | * | 7/2020 | ............. A24F 40/51 |
| WO | 2019101947 | A1 | | 5/2019 | |
| WO | 2020122428 | A1 | | 6/2020 | |
| WO | 2020182743 | A1 | | 9/2020 | |
| WO | 2020239812 | A2 | | 12/2020 | |

* cited by examiner

INDUCTION HEATING ASSEMBLY FOR AN AEROSOL GENERATING DEVICE

CROSS-REFERENCE TO RELATED APPLICATIONS

The present application is a national phase entry under 35 U.S.C. § 371 of International Application No. PCT/EP2022/051777, filed Jan. 26, 2022, published in English, which claims priority to European Application No. 21154695.7, filed Feb. 2, 2021, the disclosures of which are incorporated herein by reference.

TECHNICAL FIELD

The present disclosure relates generally to an induction heating assembly for an aerosol generating device, and more particularly to an induction heating assembly for heating an aerosol generating substrate to generate an aerosol for inhalation by a user of the aerosol generating device. Embodiments of the present disclosure also relate to an aerosol generating device comprising an induction heating assembly. The present disclosure is particularly applicable to a portable (hand-held) aerosol generating device. Such devices heat, rather than burn, an aerosol generating substrate, e.g., tobacco or other suitable materials, by conduction, convention, and/or radiation to generate an aerosol for inhalation by a user.

TECHNICAL BACKGROUND

The popularity and use of reduced-risk or modified-risk devices (also known as aerosol generating devices or vapour generating devices) has grown rapidly in recent years as an alternative to the use of traditional tobacco products. Various devices and systems are available that heat or warm aerosol generating substances to generate an aerosol for inhalation by a user.

A commonly available reduced-risk or modified-risk device is the heated substrate aerosol generating device, or so-called heat-not-burn device. Devices of this type generate an aerosol or vapour by heating an aerosol generating substrate to a temperature typically in the range 150° C. to 300° C. Heating the aerosol generating substrate to a temperature within this range, without burning or combusting the aerosol generating substrate, generates a vapour which typically cools and condenses to form an aerosol for inhalation by a user of the device.

Currently available aerosol generating devices can use one of a number of different approaches to provide heat to the aerosol generating substrate. One such approach is to provide an aerosol generating device which employs an induction heating system. In such a device, an induction coil is provided in the device and an inductively heatable susceptor is provided to heat the aerosol generating substrate. Electrical energy is supplied to the induction coil when a user activates the device which in turn generates an alternating electromagnetic field. The susceptor couples with the electromagnetic field and generates heat which is transferred, for example by conduction, to the aerosol generating substrate and an aerosol is generated as the aerosol generating substrate is heated.

It is generally desirable to rapidly heat an aerosol generating substrate to, and to maintain the aerosol generating substrate at, a temperature sufficiently high to generate a vapour. The temperature of the aerosol generating substrate must be carefully controlled to generate an aerosol with suitable characteristics and, thus, it is desirable to be able to accurately control the heating temperature. The present disclosure seeks to address this need.

SUMMARY OF THE DISCLOSURE

According to a first aspect of the present disclosure, there is provided an induction heating assembly for an aerosol generating device, the induction heating assembly comprising:

- a heating chamber for receiving at least part of an aerosol generating substrate; an induction coil positioned externally of the heating chamber for generating an electromagnetic field;
- a holder positioned inside the heating chamber;
- an inductively heatable susceptor mounted on the holder, the inductively heatable susceptor having an inner surface and an outer surface; and
- a temperature sensor mounted on the holder in contact with the outer surface of the inductively heatable susceptor.

According to a second aspect of the present disclosure, there is provided an aerosol generating device comprising:

- an induction heating assembly according to the first aspect; and
- a power source arranged to provide power to the induction coil.

The induction heating assembly is configured to heat an aerosol generating substrate, without burning the aerosol generating substrate, to volatise at least one component of the aerosol generating substrate and thereby generate a heated vapour which cools and condenses to form an aerosol for inhalation by a user of the aerosol generating device. The aerosol generating device is typically a hand-held, portable, device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

By mounting the temperature sensor on the holder, a good thermal contact is ensured between the temperature sensor and the outer surface of the inductively heatable susceptor. This ensures that an accurate measurement of the temperature of the inductively heatable susceptor can be obtained by the temperature sensor.

The induction coil may extend around the heating chamber. A good electromagnetic coupling is obtained between the electromagnetic field generated by the induction coil and the inductively heatable susceptor during use of the aerosol generating device, thereby ensuring that the inductively heatable susceptor is heated efficiently to a desired temperature.

The heating chamber may have a longitudinal axis defining a longitudinal direction. The inductively heatable susceptor may be elongate in the longitudinal direction of the heating chamber. The elongate inductively heatable susceptor is heated efficiently in the presence of an electromagnetic field and the elongate shape ensures that the aerosol generating substrate is heated rapidly and uniformly along its length. The energy efficiency of the aerosol generating device is thereby maximised.

The holder may include a proximal end and a distal end, and the temperature sensor may be mounted on the holder between the proximal and distal ends. For example, the temperature sensor may be mounted on the holder substantially at a midpoint between the proximal and distal ends.

The holder may comprise a rim at the proximal end and may comprise an elongate sensor mounting element which may extend in the longitudinal direction from the rim. The elongate sensor mounting element may have a first end positioned at the rim and a second end distal to the rim. The temperature sensor may be mounted at the second end of the elongate sensor mounting element. The elongate sensor mounting element facilitates mounting of the temperature sensor on the holder. By mounting the temperature sensor at the second end of the elongate sensor mounting element, a good contact between the temperature sensor and the outer surface of the inductively heatable susceptor is facilitated. The manufacturability and ease of assembly of the induction heating assembly is also improved.

The second end of the elongate sensor mounting element may be biased towards the outer surface of the inductively heatable susceptor. This may urge the temperature sensor into contact with the outer surface of the inductively heatable susceptor. The bias may be provided by the material from which the elongate sensor mounting element is formed, for example a resilient plastics material. A good contact between the temperature sensor and the outer surface of the inductively heatable susceptor is thereby assured. This in turn ensures that an accurate measurement of the temperature of the inductively heatable susceptor can be obtained by the temperature sensor.

The temperature sensor may be mounted on the elongate sensor mounting element and may be clamped between the elongate sensor mounting element and the outer surface of the inductively heatable susceptor. The temperature sensor may, thus, be mounted on the holder and secured in position against the outer surface of the inductively heatable susceptor prior to positioning the holder in the heating chamber. The ease of assembly of the induction heating assembly may, thus, be further improved.

The heating chamber may comprise a chamber wall which may define an interior volume of the heating chamber. The chamber wall may have an inner surface.

The temperature sensor may be positioned, and may be compressed, between the inner surface of the chamber wall and the outer surface of the inductively heatable susceptor. A good contact between the temperature sensor and the outer surface of the inductively heatable susceptor is assured because the temperature sensor is lightly pressed against the outer surface of the susceptor by the inner surface of the chamber wall. This in turn ensures that an accurate measurement of the temperature of the inductively heatable susceptor can be obtained by the temperature sensor.

The induction heating assembly may comprise a plurality of said inductively heatable susceptors which may be mounted on the holder and which may extend around the inner surface of the chamber wall. By providing a plurality of inductively heatable susceptors, more rapid and uniform heating of an aerosol generating substrate may be achieved.

The chamber wall may include a coil support structure which may be formed in or on an outer surface for supporting the induction coil. The coil support structure facilitates mounting of the induction coil and allows the induction coil to be positioned optimally with respect to the inductively heatable susceptor. The inductively heatable susceptor is, therefore, heated efficiently, thereby improving the energy efficiency of the induction heating assembly and the aerosol generating device. The provision of the coil support structure also facilitates manufacture and assembly of the induction heating assembly.

The coil support structure may comprise a coil support groove. The coil support groove may extend helically around the outer surface of the chamber wall. The coil support groove is particularly suitable for receiving a helical induction coil. Thus, the helical induction coil may extend around the heating chamber. The induction coil may comprise a Litz wire or a Litz cable. It will, however, be understood that other materials could be used. The circular cross-section of a helical induction coil may facilitate the insertion of the aerosol generating substrate into the heating chamber and may ensure uniform heating of the inductively heatable susceptor and, thus, the aerosol generating substrate.

The induction coil may be arranged to operate in use with a fluctuating electromagnetic field having a magnetic flux density of between approximately 20 mT and approximately 2.0 T at the point of highest concentration.

The heating chamber may be substantially tubular and the or each inductively heatable susceptor may be mounted on the holder so that it extends around the periphery of the substantially tubular heating chamber. The heating chamber may be substantially cylindrical and the or each inductively heatable susceptor may be mounted on the holder so that it extends around the periphery of the substantially cylindrical heating chamber. Thus, the heating chamber may be configured to receive a substantially cylindrical aerosol generating substrate which may be advantageous as, often, aerosol generating substrates in the form of aerosol generating articles are packaged and sold in a cylindrical form. The induction heating assembly may comprise two inductively heatable susceptors. Each of the inductively heatable susceptors may be elongate in the longitudinal direction and may have a substantially semi-circular cross-section.

The heating chamber and/or the holder may comprise a substantially non-electrically conductive and non-magnetically permeable material. For example, the heating chamber and/or the holder may comprise a heat-resistant plastics material, such as polyether ether ketone (PEEK). The heating chamber and/or the holder is/are not heated by the electromagnetic field generated by the induction coil during operation of the aerosol generating device, ensuring that energy input into the inductively heatable susceptor is maximised. This in turn helps to ensure that the energy efficiency of the induction heating assembly and the aerosol generating device is maximised. The aerosol generating device also remains cool to the touch, ensuring that user comfort is maximised.

The temperature sensor may be selected from the group consisting of a thermocouple, a thermistor and a resistance temperature detector (RTD). Other types of temperature sensor may, however, be employed.

The inductively heatable susceptor may comprise a metal. The metal is typically selected from the group consisting of stainless steel and carbon steel. The inductively heatable susceptor could, however, comprise any suitable material including one or more, but not limited, of aluminium, iron, nickel, stainless steel, carbon steel, and alloys thereof, e.g., Nickel Chromium or Nickel Copper. With the application of an electromagnetic field in its vicinity, the inductively heatable susceptor generates heat due to eddy currents and magnetic hysteresis losses resulting in a conversion of energy from electromagnetic to heat.

The aerosol generating device may include a power source and controller, e.g., comprising control circuitry, which may be configured to operate at a high frequency. The power source and circuitry may be configured to operate at a frequency of between approximately 80 kHz and 1 MHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

The aerosol generating substrate may comprise any type of solid or semi-solid material. Example types of aerosol generating solids include powder, granules, pellets, shreds, strands, particles, gel, strips, loose leaves, cut filler, porous material, foam material or sheets. The aerosol generating substrate may comprise plant derived material and in particular, may comprise tobacco. It may advantageously comprise reconstituted tobacco, for example including tobacco and any one or more of cellulose fibres, tobacco stalk fibres and inorganic fillers such as CaCO3.

Consequently, the aerosol generating device may be referred to as a "heated tobacco device", a "heat-not-burn tobacco device", a "device for vaporising tobacco products", and the like, with this being interpreted as a device suitable for achieving these effects.

The features disclosed herein are equally applicable to devices which are designed to vaporise any aerosol generating substrate.

The aerosol generating substrate may form part of an aerosol generating article and may be circumscribed by a paper wrapper.

The aerosol generating article may be formed substantially in the shape of a stick, and may broadly resemble a cigarette, having a tubular region with an aerosol generating substrate arranged in a suitable manner. The aerosol generating article may include a filter segment, for example comprising cellulose acetate fibres, at a proximal end of the aerosol generating article. The filter segment may constitute a mouthpiece filter and may be in coaxial alignment with the aerosol generating substrate. One or more vapour collection regions, cooling regions, and other structures may also be included in some designs. For example, the aerosol generating article may include at least one tubular segment upstream of the filter segment. The tubular segment may act as a vapour cooling region. The vapour cooling region may advantageously allow the heated vapour generated by heating the aerosol generating substrate to cool and condense to form an aerosol with suitable characteristics for inhalation by a user, for example through the filter segment.

The aerosol generating substrate may comprise an aerosol former. Examples of aerosol-formers include polyhydric alcohols and mixtures thereof such as glycerine or propylene glycol. Typically, the aerosol generating substrate may comprise an aerosol-former content of between approximately 5% and approximately 50% on a dry weight basis. In some embodiments, the aerosol generating substrate may comprise an aerosol-former content of between approximately 10% and approximately 20% on a dry weight basis, and possibly approximately 15% on a dry weight basis.

Upon heating, the aerosol generating substrate may release volatile compounds. The volatile compounds may include nicotine or flavour compounds such as tobacco flavouring.

DETAILED DESCRIPTION OF EMBODIMENTS

Embodiments of the present disclosure will now be described by way of example only and with reference to the accompanying drawings.

Figure 1:
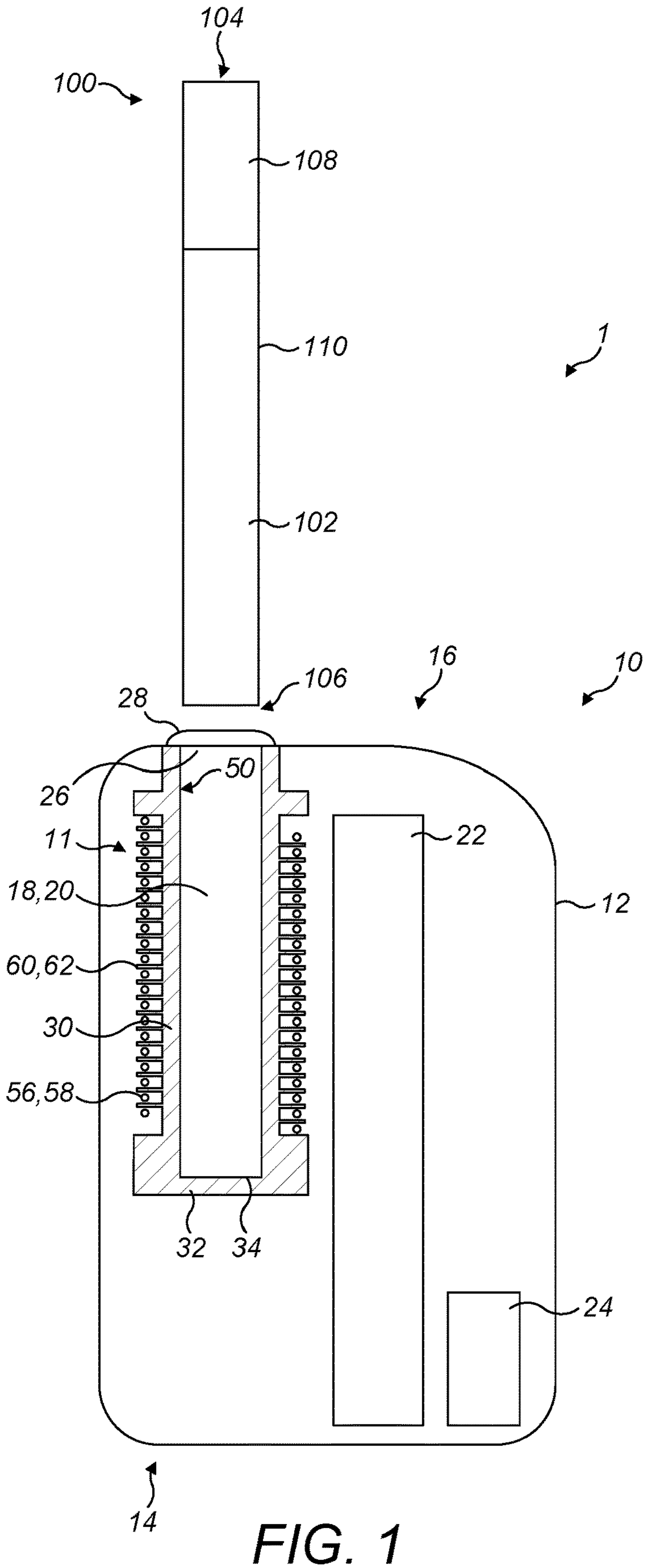
FIG. 1 is a diagrammatic cross-sectional view of an aerosol generating system comprising an aerosol generating device and an aerosol generating article ready to be positioned in a heating chamber of the aerosol generating device.
Figure 2:
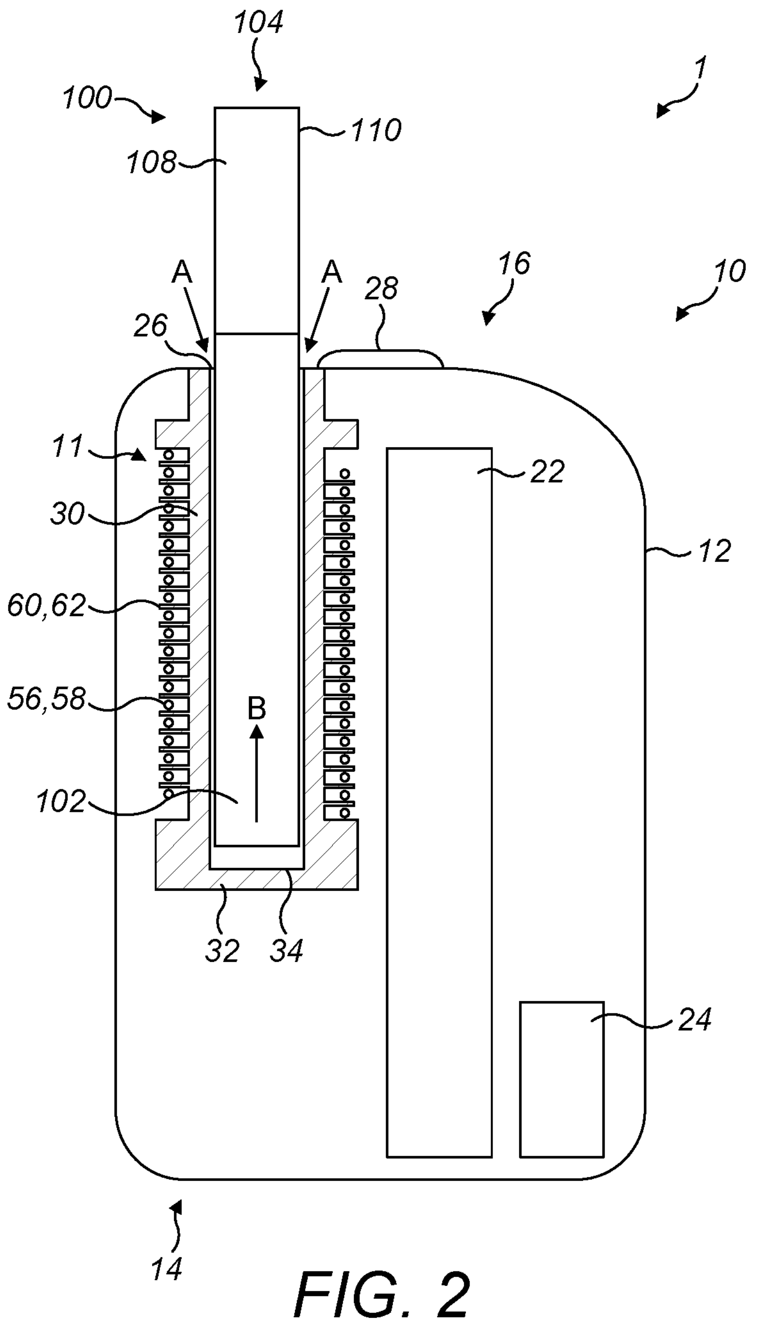
FIG. 2 is a diagrammatic cross-sectional view of the aerosol generating system of FIG. 1, showing the aerosol generating article positioned in the heating chamber of the aerosol generating device.

Referring initially to FIGS. 1 and 2, there is shown diagrammatically an example of an aerosol generating system 1. The aerosol generating system 1 comprises an aerosol generating device 10 and an aerosol generating article 100 for use with the device 10. The aerosol generating device 10 comprises a main body 12 housing various components of the aerosol generating device 10. The main body 12 can have any shape that is sized to fit the components described in the various embodiments set out herein and to be comfortably held by a user unaided, in a single hand.

A first end 14 of the aerosol generating device 10, shown towards the bottom of FIGS. 1 and 2, is described for convenience as a distal, bottom, base or lower end of the aerosol generating device 10. A second end 16 of the aerosol generating device 10, shown towards the top of FIGS. 1 and 2, is described as a proximal, top or upper end of the aerosol generating device 10. During use, the user typically orients the aerosol generating device 10 with the first end 14 downward and/or in a distal position with respect to the user's mouth and the second end 16 upward and/or in a proximate position with respect to the user's mouth.

The aerosol generating device 10 comprises an induction heating assembly 11 positioned in the main body 12. The induction heating assembly 11 comprises a heating chamber 18. The heating chamber 18 defines an interior volume in the form of a cavity 20 having a substantially cylindrical cross-section for receiving an aerosol generating article 100. The heating chamber 18 has a longitudinal axis defining a longitudinal direction and is formed of a heat-resistant plastics material, such as polyether ether ketone (PEEK). The aerosol generating device 10 further comprises a power source 22, for example one or more batteries which may be rechargeable, and a controller 24.

The heating chamber 18 is open towards the second end 16 of the aerosol generating device 10. In other words, the heating chamber 18 has an open first end 26 towards the second end 16 of the aerosol generating device 10. The heating chamber 18 is typically held spaced apart from the inner surface of the main body 12 to minimise heat transfer to the main body 12.

The aerosol generating device 10 can optionally include a sliding cover 28 movable transversely between a closed position (see FIG. 1) in which it covers the open first end 26 of the heating chamber 18 to prevent access to the heating chamber 18 and an open position (see FIG. 2) in which it exposes the open first end 26 of the heating chamber 18 to provide access to the heating chamber 18. The sliding cover 28 can be biased to the closed position in some embodiments.

The heating chamber 18, and specifically the cavity 20, is arranged to receive a correspondingly shaped generally cylindrical or rod-shaped aerosol generating article 100. Typically, the aerosol generating article 100 comprises a pre-packaged aerosol generating substrate 102. The aerosol generating article 100 is a disposable and replaceable article (also known as a "consumable") which may, for example, contain tobacco as the aerosol generating substrate 102. The aerosol generating article 100 has a proximal end 104 (or mouth end) and a distal end 106. The aerosol generating article 100 further comprises a mouthpiece segment 108 positioned downstream of the aerosol generating substrate 102. The aerosol generating substrate 102 and the mouthpiece segment 108 are arranged in coaxial alignment inside a wrapper 110 (e.g., a paper wrapper) to hold the components in position to form the rod-shaped aerosol generating article 100.

The mouthpiece segment 108 can comprise one or more of the following components (not shown in detail) arranged sequentially and in co-axial alignment in a downstream direction, in other words from the distal end 106 towards the proximal (mouth) end 104 of the aerosol generating article 100: a cooling segment, a center hole segment and a filter segment. The cooling segment typically comprises a hollow paper tube having a thickness which is greater than the thickness of the wrapper 110. The center hole segment may comprise a cured mixture containing cellulose acetate fibres and a plasticizer, and functions to increase the strength of the mouthpiece segment 108. The filter segment typically comprises cellulose acetate fibres and acts as a mouthpiece filter. As heated vapour flows from the aerosol generating substrate 102 towards the proximal (mouth) end 104 of the aerosol generating article 100, the vapour cools and condenses as it passes through the cooling segment and the center hole segment to form an aerosol with suitable characteristics for inhalation by a user through the filter segment.

The heating chamber 18 has a side wall (or chamber wall) 30 extending between a base 32, located at a second end 34 of the heating chamber 18, and the open first end 26. The side wall 30 and the base 32 are connected to each other and can be integrally formed as a single piece. In the illustrated embodiment, the side wall 30 is tubular and, more specifically, cylindrical. In other embodiments, the side wall 30 can have other suitable shapes, such as a tube with an elliptical or polygonal cross section. In yet further embodiments, the side wall 30 can be tapered.

In the illustrated embodiment, the base 32 of the heating chamber 18 is closed, e.g., sealed or air-tight. That is, the heating chamber 18 is cup shaped. This can ensure that air drawn from the open first end 26 is prevented by the base 32 from flowing out of the second end 34 and is instead guided through the aerosol generating substrate 102.

Figure 3:
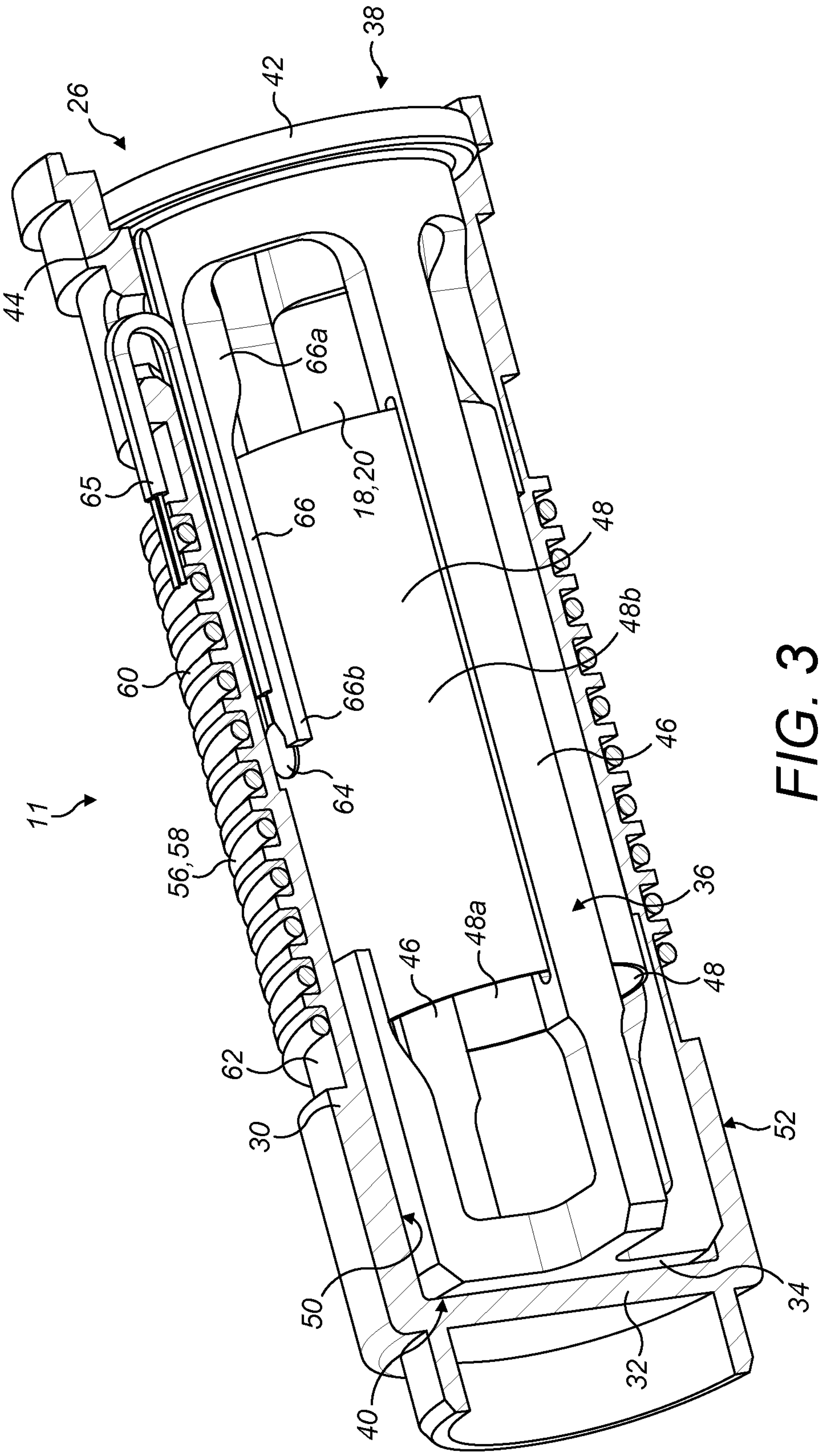
FIG. 3 is a diagrammatic cutaway perspective view of a first example of an induction heating assembly of the aerosol generating device of FIGS. 1 and 2, showing a holder positioned in the heating chamber, along with inductively heatable susceptors and a temperature sensor mounted on the holder.
Figure 4:
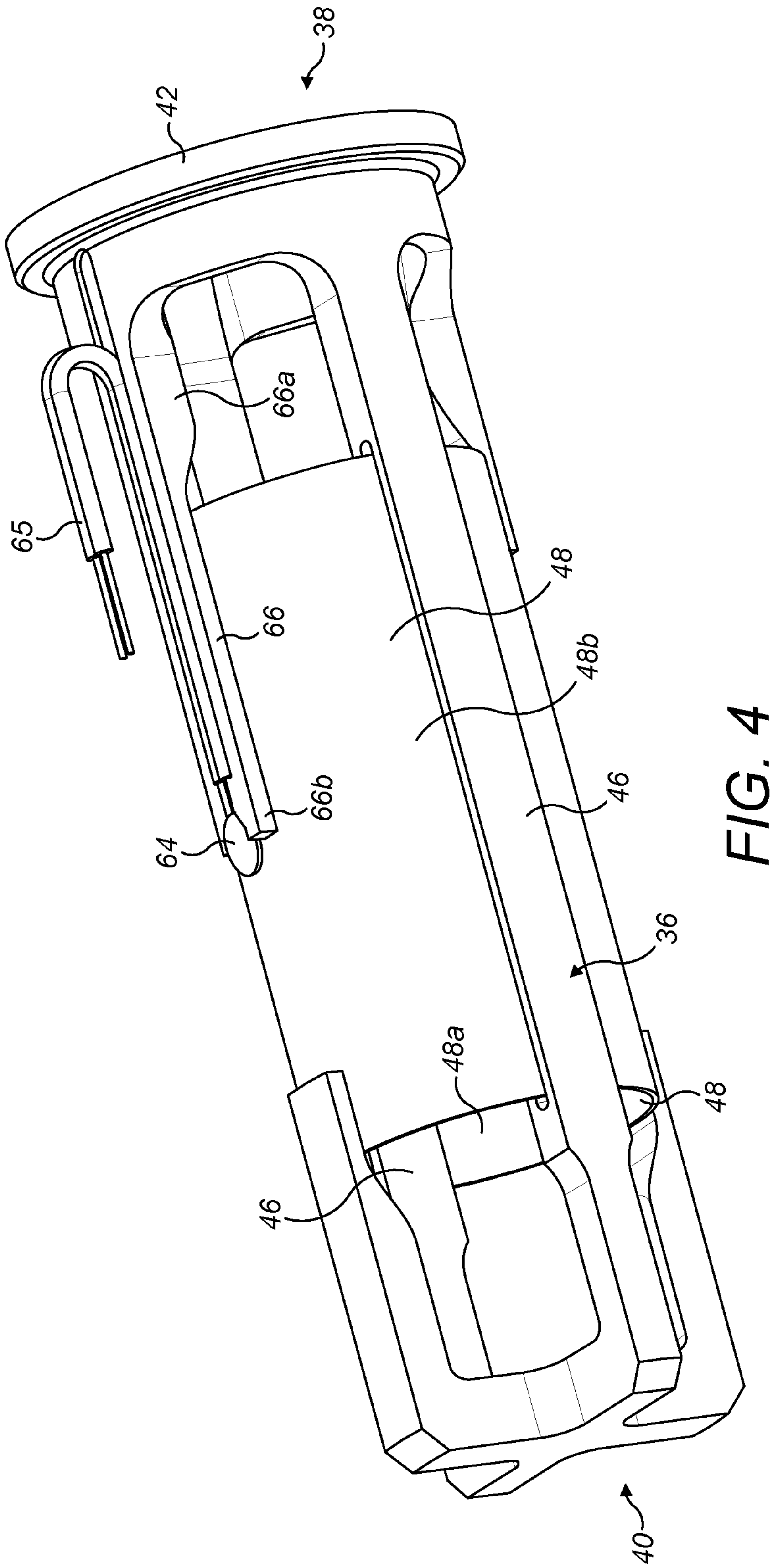
FIG. 4 is a diagrammatic perspective view of the holder, the inductively heatable susceptors and the temperature sensor of FIG. 3 without the heating chamber.
Figure 5:
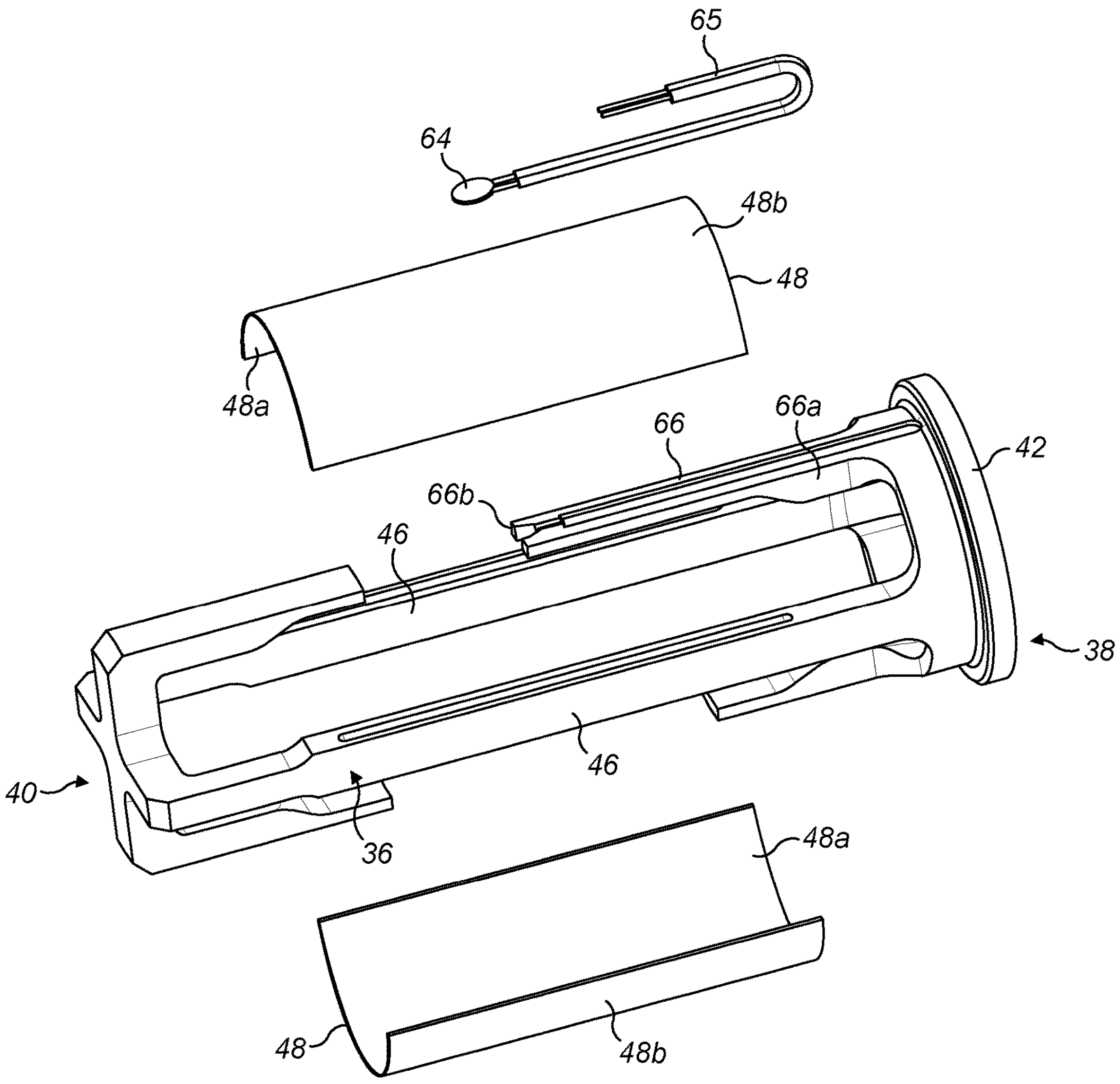
FIG. 5 is an exploded view of the holder, the inductively heatable susceptors and the temperature sensor of FIG. 4.

Referring in particular to FIGS. 3 to 5, the induction heating assembly 11 comprises a holder 36 positioned in the cavity 20 of the heating chamber 18 and which is also formed of a heat-resistant plastics material, such as polyether ether ketone (PEEK). The holder 36 has a proximal end 38 and a distal end 40 and comprises a rim 42 at the proximal end 38 which cooperates with a circumferential lip 44 at the open first end 26 of the heating chamber 18 (best seen in FIG. 3). The holder 36 includes two longitudinally extending susceptor mounts 46 which extend from the rim 42 towards the distal end 40 of the holder 36. Two elongate substantially semi-circular inductively heatable susceptors 48 are mounted on the holder 36 by the susceptor mounts 46 so that together, the inductively heatable susceptors 48 form a susceptor with a tubular form. Each of the inductively heatable susceptors 48 has an inner surface **48*a* and an outer surface 48*b*. The inductively heatable susceptors 48, and more particularly the inner surface 48*a* of the inductively heatable susceptors 48, may contact the aerosol generating substrate 102 to form a friction fit with the aerosol generating substrate 102, and more particularly with the wrapper 110 of the aerosol generating article 100. In alternative embodiments, the inductively heatable susceptors 48, and more particularly the inner surface 48*a*, may be spaced from the aerosol generating substrate 102**.

The side wall 30 of the heating chamber 18 has an inner surface 50 and an outer surface 52, and the inductively heatable susceptors 48 extend around the inner surface 50 of the side wall 30. The outer surface **48*b* of the inductively heatable susceptors 48 faces, but is typically spaced apart from, the inner surface 50 of the side wall 30 so that air can flow between the outer surface 48*b* of the inductively heatable susceptors 48 and the inner surface 50 of the side wall 30**.

The induction heating assembly 11 comprises an electromagnetic field generator 56 for generating an electromagnetic field. The electromagnetic field generator 56 comprises a substantially helical induction coil 58. The induction coil 58 has a circular cross-section and extends helically around the substantially cylindrical heating chamber 18. The induction coil 58 can be energised by the power source 22 and controller 24. The controller 24 includes, amongst other electronic components, an inverter which is arranged to convert a direct current from the power source 22 into an alternating high-frequency current for the induction coil 58.

The side wall 30 of the heating chamber 18 includes a coil support structure 60 formed in the outer surface 52. In the illustrated example, the coil support structure 60 comprises a coil support groove 62 which extends helically around the outer surface 52. The induction coil 58 is positioned in the coil support groove 62 and is, thus, securely and optimally positioned with respect to the inductively heatable susceptors 48.

The induction heating assembly 11 further comprises a temperature sensor 64, which may for example be a thermocouple, a thermistor, a resistance temperature detector (RTD) or any other suitable temperature sensor. The temperature sensor 64 is operatively coupled to the controller 24 by one or more connectors 65.

The temperature sensor 64 is mounted on the holder 36 in contact with the outer surface **48*b* of one of the inductively heatable susceptors 48, thus allowing the temperature of the inductively heatable susceptor 48 to be measured by the temperature sensor 64. More specifically, the holder 36 includes a sensor mounting element 66 which extends from the rim 42 in the longitudinal direction from the proximal end 38 towards the distal end 40. The sensor mounting element 66 has a first end 66*a* positioned at the rim 42 and formed integrally with the rim 42, and a second end 66*b*** distal to the rim 42. The second end 66*b* of the sensor mounting element 66 is located substantially at a midpoint between the proximal end 38 and the distal end 40 of the holder 36. The temperature sensor 64 is mounted at the second end 66*b* of the sensor mounting element 66, e.g., in a cut-out portion, and, thus, the temperature sensor 64 is mounted on the holder 36 substantially at a midpoint between the proximal end 38 and the distal end 40. Other mounting positions are, of course, possible and will depend on the length of the sensor mounting element 66 in the longitudinal direction.

In some embodiments, the second end 66*b* of the sensor mounting element 66 can be biased towards the outer surface 48*b* of the inductively heatable susceptor 48 to urge the temperature sensor 64 into contact with the outer surface 48*b*. For example, the sensor mounting element 66 can be formed from a resilient plastics material which is biased towards the outer surface 48*b*. In the example illustrated in FIGS. 3 to 5, the temperature sensor 64 is positioned between the inner surface 50 of the side wall 30 of the heating chamber 18 and the outer surface 48*b* of the inductively heatable susceptor 48. The temperature sensor 64 is, thus, clamped in position as best seen in FIG. 3, and may be lightly pressed by the inner surface 50 of the side wall 30 of the heating chamber 18 against the outer surface 48*b* of the inductively heatable susceptor 48, thus further ensuring good contact between the temperature sensor 64 and the inductively heatable susceptor 48.

In order to use the aerosol generating device 10, a user displaces the sliding cover 28 (if present) from the closed position shown in FIG. 1 to the open position shown in FIG. 2. The user then inserts an aerosol generating article 100 through the open first end 26 into the heating chamber 18, and more specifically into the holder 36 positioned in the heating chamber 18, so that the aerosol generating substrate 102 is received in the cavity 20 and so that the proximal end 104 of the aerosol generating article 100 is positioned at the open first end 26 of the heating chamber 18, with at least part of the mouthpiece segment 108 projecting from the open first end 26 to permit engagement by a user's lips.

Upon activation of the aerosol generating device 10 by a user, the induction coil 58 is energised by the power source 22 and controller 24 which supply an alternating electrical current to the induction coil 58, and an alternating and time-varying electromagnetic field is thereby produced by the induction coil 58. This couples with the inductively heatable susceptors 48 and generates eddy currents and/or magnetic hysteresis losses in the susceptors 48 causing them to heat up. The heat is transferred from the inductively heatable susceptors 48 to the aerosol generating substrate 102, for example by conduction, radiation and convection. This results in heating of the aerosol generating substrate 102 without combustion or burning, and a vapour is thereby generated. The generated vapour cools and condenses to form an aerosol which can be inhaled by a user of the aerosol generating device 10 through the mouthpiece segment 108, and more particularly through the filter segment.

The vaporisation of the aerosol generating substrate 102 is facilitated by the addition of air from the surrounding environment, for example through the open first end 26 of the heating chamber 18, the air being heated as it flows between the outer surface 48*b* of the inductively heatable susceptors 48 and the inner surface 50 of the side wall 30. More particularly, when a user sucks on the filter segment, air is drawn into the heating chamber 18 through the open first end 26 as illustrated by the arrows A in FIG. 2 and the air is heated as it flow through the heating chamber 18 from the open first end 26 towards the closed second end 34. When the air reaches the closed second end 34 of the heating chamber 18, it turns through approximately 180° and enters the distal end 106 of the aerosol generating article 100. The air is then drawn through the aerosol generating article 100 as illustrated by the arrow B in FIG. 2, from the distal end 106 towards the proximal (mouth) end 104 along with the generated vapour.

A user can continue to inhale aerosol all the time that the aerosol generating substrate 102 is able to continue to produce a vapour, e.g., all the time that the aerosol generating substrate 102 has vaporisable components left to vaporise into a suitable vapour. The controller 24 can adjust the magnitude of the alternating electrical current passed through the induction coil 58 to ensure that the temperature of the inductively heatable susceptors 48, and in turn the temperature of the aerosol generating substrate 102, does not exceed a threshold level. Specifically, at a particular temperature, which depends on the constitution of the aerosol generating substrate 102, the aerosol generating substrate 102 will begin to burn. This is not a desirable effect and temperatures above and at this temperature are avoided.

To assist with this, the controller 24 is configured to receive an indication of the temperature of the aerosol generating substrate 102, and more specifically the inductively heatable susceptors 48, from the temperature sensor 64 and to use the temperature indication to control the magnitude of the alternating electrical current supplied to the induction coil 58. In one example, the controller 24 may supply a first magnitude of electrical current to the induction coil 58 for a first time period to heat the inductively heatable susceptors 48 to a first temperature. Subsequently, the controller 24 may supply a second magnitude of alternating electrical current to the induction coil 58 for a second time period to heat the inductively heatable susceptors 48 to a second temperature. The second temperature may be lower than the first temperature. Subsequently, the controller 24 may supply a third magnitude of alternating electrical current to the induction coil 58 for a third time period to heat the inductively heatable susceptors 48 to the first temperature again. This may continue until the aerosol generating substrate 102 is expended (i.e., all vapour which can be generated by heating has already been generated) or the user stops using the aerosol generating device 10. In another scenario, once the first temperature has been reached, the controller 24 can reduce the magnitude of the alternating electrical current supplied to the induction coil 58 to maintain the aerosol generating substrate 102 at the first temperature throughout a session.

A single inhalation by a user is generally referred to a "puff". In some scenarios, it is desirable to emulate a cigarette smoking experience, which means that the aerosol generating device 10 is typically capable of holding sufficient aerosol generating substrate 102 to provide ten to fifteen puffs.

In some embodiments, the controller 24 is configured to count puffs and to interrupt the supply of electrical current to the induction coil 58 after ten to fifteen puffs have been taken by a user. Puff counting can be performed in a variety of different ways. In some embodiments, the controller 24 determines when the temperature decreases during a puff, as fresh, cool air flows past the inductively heatable susceptors 48, causing cooling of the susceptors 48 which is detected by the temperature sensor 64. In other embodiments, air flow is detected directly using a flow detector. Other suitable methods will be apparent to one of ordinary skill in the art. In other embodiments, the controller 24 additionally or alternatively interrupts the supply of electrical current to the induction coil 58 after a predetermined amount of time has elapsed since a first puff. This can help to both reduce power consumption and provide a back-up for switching off the aerosol generating device 10 in the event that the puff counter fails to correctly register that a predetermined number of puffs has been taken.

In some examples, the controller 24 is configured to supply an alternating electrical current to the induction coil 58 so that it follows a predetermined heating cycle, which takes a predetermined amount of time to complete. Once the cycle is complete, the controller 24 interrupts the supply of electrical current to the induction coil 58. In some cases, this cycle may make use of a feedback loop between the controller 24 and the temperature sensor 64. For example, the heating cycle may be parameterised by a series of temperatures to which the inductively heatable susceptors 48 are heated or allowed to cool. The temperatures and durations of such a heating cycle can be empirically determined to optimise the temperature of the aerosol generating substrate 102. This may be necessary as direct measurement of the temperature of the aerosol generating substrate 102 can be impractical, or misleading, for example where the outer layer of substrate is a different temperature to the core.

The power source 22 is sufficient to at least bring the aerosol generating substrate 102 in a single aerosol generating article 100 up to the first temperature and maintain it at the first temperature to provide sufficient vapour for at least ten to fifteen puffs. More generally, in line with emulating the experience of cigarette smoking, the power source 22 is usually sufficient to repeat this cycle (bring the aerosol generating substrate 102 up to the first temperature, maintain the first temperature and vapour generation for ten to fifteen puffs) ten times, or even twenty times, thereby emulating a user's experience of smoking a packet of cigarettes, before there is a need to replace or recharge the power source 22.

In general, the efficiency of the aerosol generating device 10 is improved when as much as possible of the heat that is generated by the inductively heatable susceptors 48 results in heating of the aerosol generating substrate 102. To this end, the aerosol generating device 10 is usually configured to provide heat in a controlled manner to the aerosol generating substrate 102 while reducing heat flow to other parts of the aerosol generating device 10. In particular, heat flow to parts of the aerosol generating device 10 that the user handles are kept to a minimum, thereby keeping these parts cool and comfortable to hold.

Figure 6:
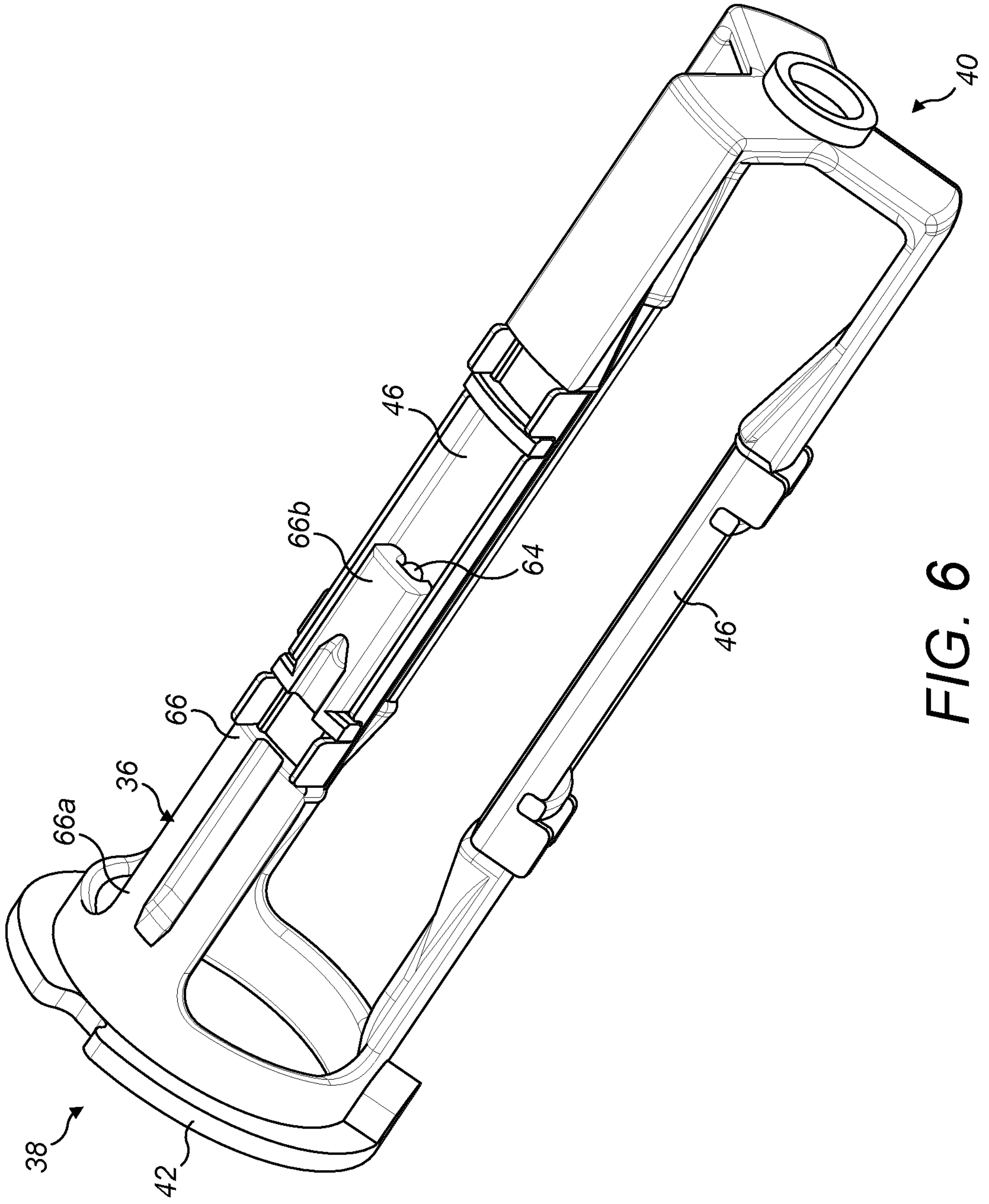
FIG. 6 is a diagrammatic perspective view of a second example of part of an induction heating assembly, showing a holder and a temperature sensor mounted on the holder.
Figure 7:
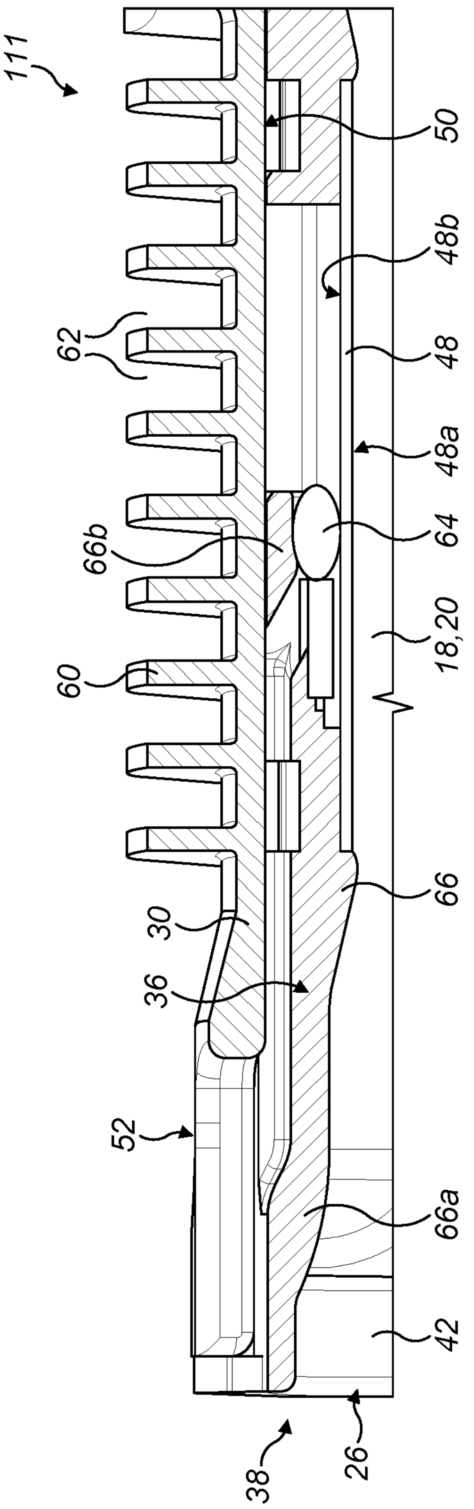
FIG. 7 is a diagrammatic cross-sectional view of part of the induction heating assembly of FIG. 6, showing the holder positioned in the heating chamber of the aerosol generating device of FIGS. 1 and 2.

Referring now to FIGS. 6 and 7, there is shown a second example of part of an induction heating assembly 111. The induction heating assembly 111 is similar to the induction heating assembly 11 described above with reference to FIGS. 3 to 5 and corresponding components are identified using the same reference numerals.

In the induction heating assembly 111, the temperature sensor 64 is mounted at the second end 66*b* of the sensor mounting element 66 such that it is positioned between the sensor mounting element 66 and the outer surface 48*b* of the inductively heatable susceptor 48. The sensor mounting element 66 clamps the temperature sensor 64 in position against the outer surface 48*b* of the inductively heatable susceptor 48 (best seen in FIG. 7), thus further ensuring good contact between the temperature sensor 64 and the inductively heatable susceptor 48.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An induction heating assembly for an aerosol generating device, the induction heating assembly comprising:
- a heating chamber for receiving at least part of an aerosol generating substrate;
- an induction coil positioned externally of the heating chamber for generating an electromagnetic field;
- a holder positioned inside the heating chamber;
- an inductively heatable susceptor mounted on the holder, the inductively heatable susceptor having an inner surface and an outer surface; and
- a temperature sensor mounted on the holder in contact with the outer surface of the inductively heatable susceptor,
- wherein the holder includes a proximal end and a distal end, and the temperature sensor is mounted on the holder between the proximal and distal ends.

2. The induction heating assembly according to claim 1, wherein the induction coil extends around the heating chamber.

3. The induction heating assembly according to claim 1, wherein the heating chamber has a longitudinal axis defining a longitudinal direction and the inductively heatable susceptor is elongate in the longitudinal direction of the heating chamber.

4. The induction heating assembly according to claim 1, wherein the holder comprises:
- a rim at the proximal end;
- an elongate sensor mounting element extending in the longitudinal direction from the rim, the elongate sensor mounting element having a first end positioned at the rim and a second end distal to the rim; and
- the temperature sensor is mounted at the second end of the elongate sensor mounting element.

5. The induction heating assembly according to claim 4, wherein the second end of the elongate sensor mounting element is biased towards the outer surface of the inductively heatable susceptor to urge the temperature sensor into contact with the outer surface of the inductively heatable susceptor.

6. The induction heating assembly according to claim 4, wherein the temperature sensor is mounted on the elongate sensor mounting element such that the temperature sensor is clamped between the elongate sensor mounting element and the outer surface of the inductively heatable susceptor.

7. The induction heating assembly according to claim 1, wherein the heating chamber comprises a chamber wall defining an interior volume of the heating chamber and the chamber wall has an inner surface.

8. The induction heating assembly according to claim 7, wherein the temperature sensor is positioned between the inner surface of the chamber wall and the outer surface of the inductively heatable susceptor.

9. The induction heating assembly according to claim 7, wherein the inductively heatable susceptor comprises a plurality of inductively heatable susceptors mounted on the holder and extending around the inner surface of the chamber wall.

10. The induction heating assembly according to claim 9, wherein the heating chamber is substantially tubular and the inductively heatable susceptors are mounted on the holder so that they extend around a periphery of the substantially tubular heating chamber.

11. The induction heating assembly of claim 10, wherein the heating chamber is substantially cylindrical and the inductively heatable susceptors are mounted on the holder so that they extend around the substantially cylindrical heating chamber.

12. The induction heating assembly according to claim 7, wherein the chamber wall includes a coil support structure formed in or on an outer surface for supporting the induction coil.

13. The induction heating assembly according to claim 7, wherein the chamber wall includes a coil support groove formed in or on an outer surface for supporting the induction coil.

14. The induction heating assembly of claim 13, wherein the coil support groove extends helically around the outer surface of the chamber wall.

15. The induction heating assembly according to claim 1, wherein one or both of the heating chamber and the holder comprises a substantially non-electrically conductive and non-magnetically permeable material.

16. The induction heating assembly of claim 15, wherein one or both of the heating chamber and the holder comprises a heat-resistant plastics material.

17. An aerosol generating device comprising:

the induction heating assembly according to claim 1; and a power source arranged to provide power to the induction coil.

18. The induction heating assembly according to claim 1, wherein the temperature sensor is mounted substantially at a midpoint between the proximal and distal ends of the holder.

* * * * *